United States Patent [19]

Masui et al.

[11] 4,455,619

[45] Jun. 19, 1984

[54] INTERACTIVE EQUIPMENT FOR COMPUTER PROGRAMMING BY LINKAGE OF LABELED BLOCK REPRESENTATIONS OF ARITHMETIC/LOGICAL SUBPROGRAMS

[75] Inventors: Shoichi Masui, Kawasaki; Mikihiko Oonari, Kokubunji; Kunio Yamanaka, Mito; Masaoki Takaki, Hitachi, all of Japan

[73] Assignee: Hitachi, Ltd., Tokyo, Japan

[21] Appl. No.: 268,369

[22] Filed: May 29, 1981

[30] Foreign Application Priority Data

May 30, 1980 [JP] Japan ................................ 55-71390

[51] Int. Cl.³ .......................... G06F 3/00; G06F 3/14; G06F 9/06; G06F 15/06
[52] U.S. Cl. .................... 364/900; 364/147; 364/300
[58] Field of Search ............... 364/200, 900, 300, 147, 364/488, 491

[56] References Cited

U.S. PATENT DOCUMENTS

| | | | |
|---|---|---|---|
| 3,702,004 | 10/1972 | Eskew et al. | 364/300 |
| 3,753,240 | 8/1973 | Merwin | 364/900 |
| 3,882,446 | 5/1975 | Brittain et al. | 364/900 |
| 4,204,253 | 5/1980 | van den Hanenberg et al. | 364/200 |
| 4,227,245 | 10/1980 | Edblad et al. | 364/468 |
| 4,244,032 | 1/1981 | Oliver | 364/900 |
| 4,244,034 | 1/1981 | Cherba | 364/900 |
| 4,315,315 | 2/1982 | Kossiakoff | 364/300 |
| 4,328,550 | 5/1982 | Weber | 364/474 |

Primary Examiner—James D. Thomas
Assistant Examiner—Archie E. Williams, Jr.
Attorney, Agent, or Firm—Antonelli, Terry & Wands

[57] ABSTRACT

A programming equipment is used for automatically constructing programs by selecting and interconnecting a plurality of previously prepared unit programs in accordance with instructions by an operator. A screen of a display unit is divided into a plurality of partial display areas. A memory has a plurality of unit storage areas, one for each partial display area, for storing unit program names and data flow specifications. The information of the respective area is displayed in block form on the display unit so that the operator can readily construct a process data flow by operating the input device while watching the display unit. The programming equipment reads out the area information from the areas in a predetermined sequence, and selects and interconnects the unit programs to construct the program corresponding to the process data flow.

6 Claims, 22 Drawing Figures

| SUBPROGRAM NAME | LEADING ADDRESS | SUBPROGRAM MEMORY CAPACITY | EXTERNAL ADDRESS | FLAG INFORMATION |
|---|---|---|---|---|
| SET | 00001000 | 50 | 00000500 | 1 |
| ADD | 00001050 | 80 | 00000000 | 0 |
| PID | 00001130 | 500 | 00000000 | 0 |
| ---- | ---- | ---- | ---- | ---- |

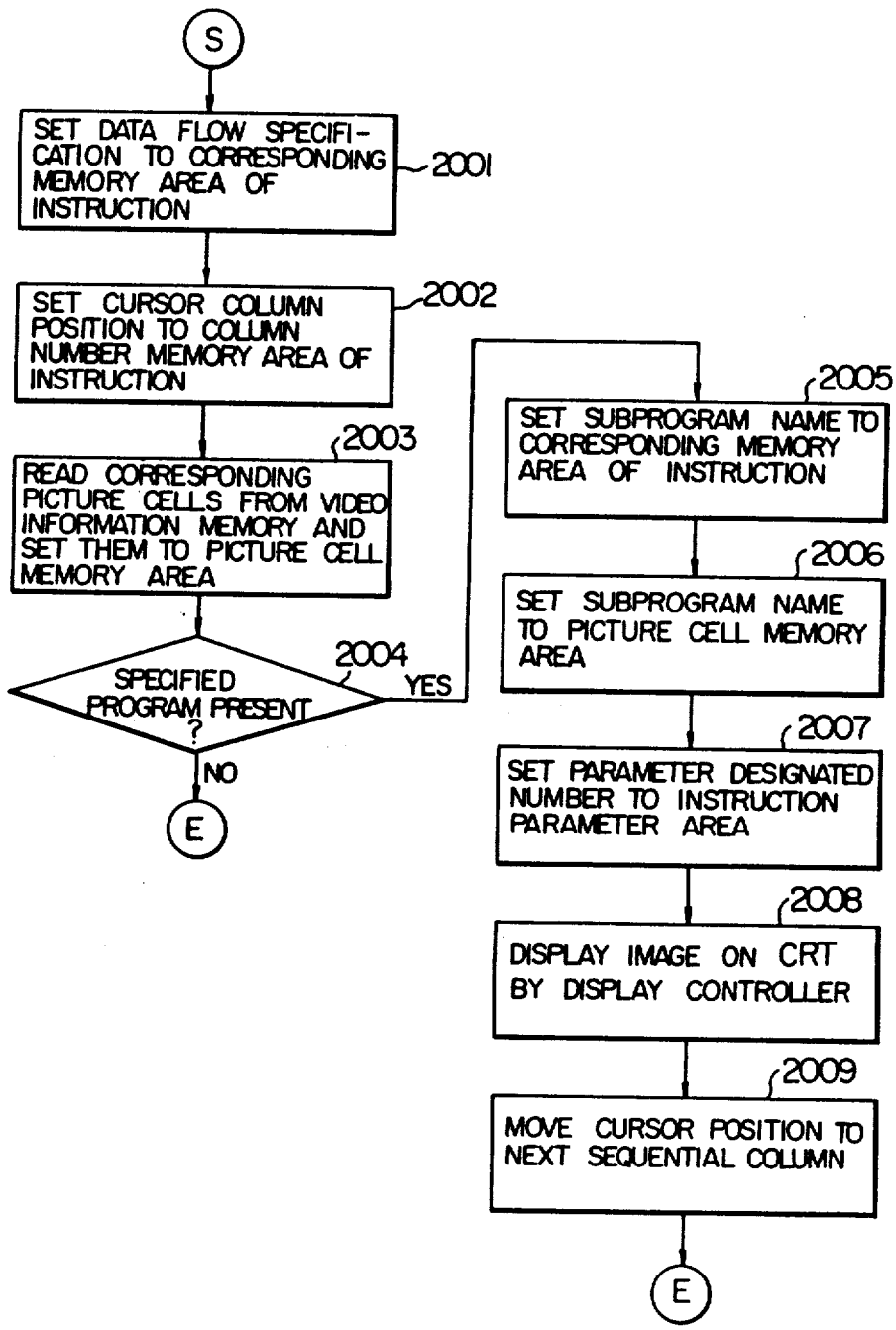

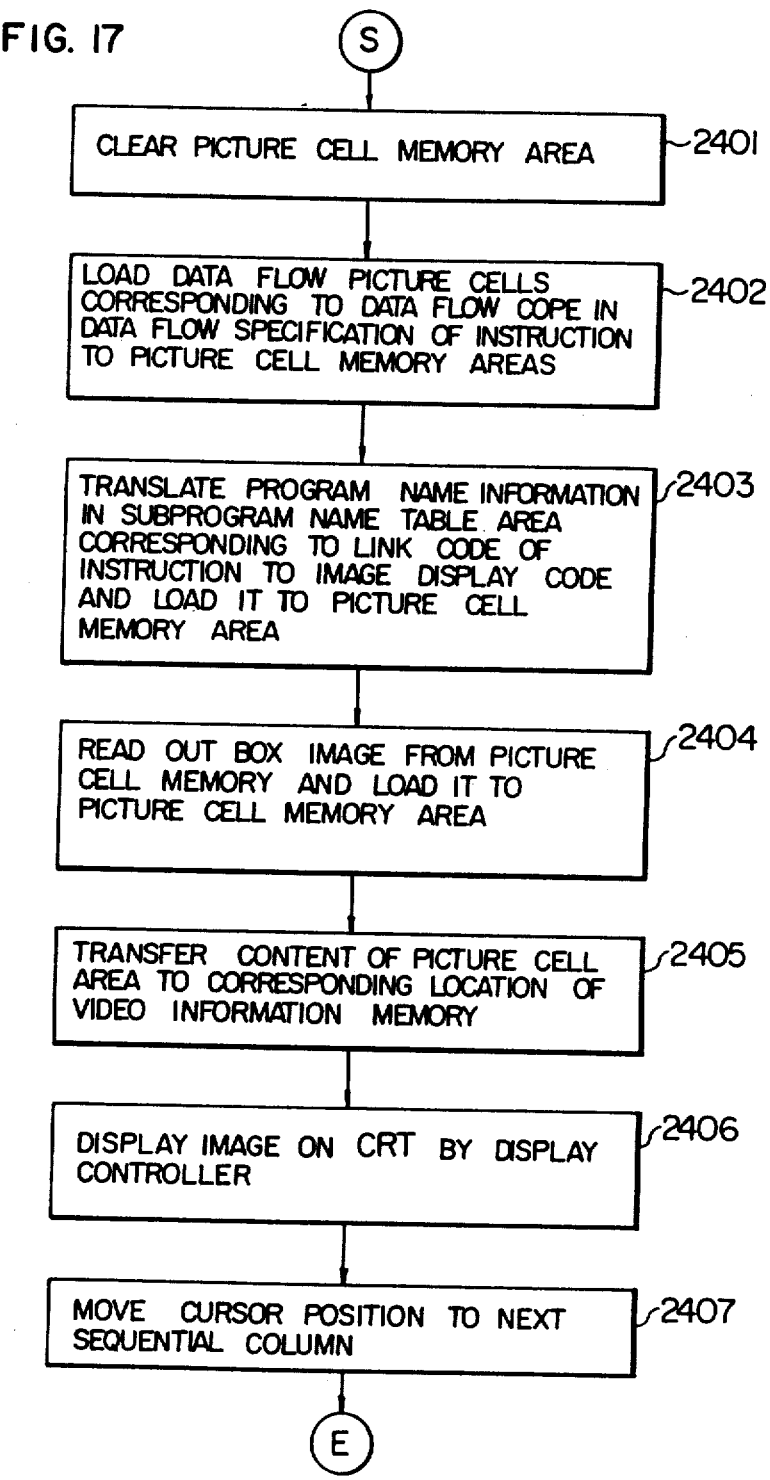

ND BLOCK REPRESENTATIONS OF
INTERACTIVE EQUIPMENT FOR COMPUTER PROGRAMMING BY LINKAGE OF LABELED BLOCK REPRESENTATIONS OF ARITHMETIC/LOGICAL SUBPROGRAMS

The present invention relates to programming equipment which facilitates programming for an electronic computer, such as programming for performing various controls, e.g. proportional/integral/derivative (PID) control and analog numeric arithmetic operation control in a control computer.

In order to allow a general purpose controller, such as an electronic computer, to perform a desired processing function, it is usually necessary to store in a memory of the computer a sequence of instructions or a program which can be decoded by the electronic computer and which specifies predetermined operations. The instructions are usually represented by digital codes, and for this reason it is difficult for human beings to comprehend such instructions. Accordingly, programs expressed in a human understandable form have been developed. High class languages such as Assembler Language, FORTRAN and ALGOL have been developed for this purpose and many other languages have been developed. However, many of those languages require knowledge of the electronic computer when one wishes to use them. Accordingly, they have been hard to handle for ordinary control engineers. As an approach to the above difficulty, Problem Oriented Program has been developed, but even this program is not easy to handle and it takes many days for one to be skilled in the program. In addition, when a program is written, a procedure is needed for converting a functional relation diagram to a sequence of instructions.

SUMMARY OF THE INVENTION

It is an object of the present invention to provide programming equipment which overcomes the problems encountered in the prior art and allows the ordinary control engineers to prepare a data flow chart representing data flows among functions in the form of a block diagram, which is familiar to those control engineers when they design a control system and to enter the data flow chart as it is into the electronic computer.

It is another object of the present invention to provide a programming method and programming equipment which makes possible programming for attaining a desired processing function with ease and without substantial knowledge about the electronic computer, and which prevents automatic entry into the electronic computer.

To achieve the above objects, in accordance with the present invention, there is provided programming equipment which comprises a display unit; a memory having a plurality of unit memory areas one for each of a plurality of partial display areas which form at least a portion of the display area of the display unit and a memory area for storing address information to designate one of the plurality of unit memory areas; an input device for inputting names of subprograms a predetermined one for each of a plurality of arithmetic and logical operations, data flow specifications for specifying data flows among symbols of the subprograms, instructions for modifying the address information and instructions for reading out the information of the plurality of unit memory areas to an external unit; and a processor coupled to the display unit, the memory and the input device. The processor functions to store the subprogram names and the data flow specifications in the unit memory area designated by the address information and to display the symbols of the subprograms and the data flow specified by the data flow specifications on the partial display areas designated by the address information. The information is read out to the external unit in a predetermined sequence from the unit memory areas in accordance with the instructions.

BRIEF DESCRIPTION OF THE DRAWINGS

The present invention will be apparent from the following detailed description taken in conjunction with the accompanying drawings, in which:

FIGS. 8 to 13 are flow charts for illustrating an operation of a first embodiment of the present invention, in which FIG. 8 is a flow chart for illustrating an operation of programming equipment 1, FIG. 9 is a detailed flow chart for an initialization step 1000 of FIG. 8, FIG. 10 is a detailed flow chart for an instruction construction and CRT displaying step 2000 of FIG. 8, FIG. 11 is a detailed flow chart for a transfer preparation step 4000 of FIG. 8, FIG. 12 is a detailed flow chart for a transfer step 5000 of FIG. 8 and FIG. 13 is a flow chart for illustrating an operation of a control processor 90;

FIGS. 14 to 19 are a flow chart for illustrating an operation of a second embodiment of the present invention which is partially modified from the first embodiment, in which FIG. 14 is a flow chart for illustrating an operation of the programming equipment 1 which differs from FIG. 8 in that connection confirmation step 810 to the control processor is added, the transfer to the control processor is automatically carried out after the construction of one loop sentence without requiring the depression of a transfer key (steps 5100 and 5200), and the instruction construction step 200 is divided into an instruction translating step 2300 and a CRT displaying step 2400, FIG. 15 is a detailed flow chart for a one loop sentence construction preparation step 1500 of FIG. 14, FIG. 16 shows a detailed flow chart for the instruction translation step 2300 of FIG. 14, FIG. 17 is a detailed flow chart of the CRT displaying step 2400 of FIG. 14, FIG. 18 is a detailed flow chart for a one loop instruction transfer step of FIG. 14 and FIG. 19 is a detailed flow chart for a subprogram transfer step 5300 of FIG. 14. In FIGS. 14 to 19, those steps which are duplicates of FIGS. 8 to 13 are omitted.

DETAILED DESCRIPTION OF THE PREFERRED EMBODIMENTS

Figure 1:
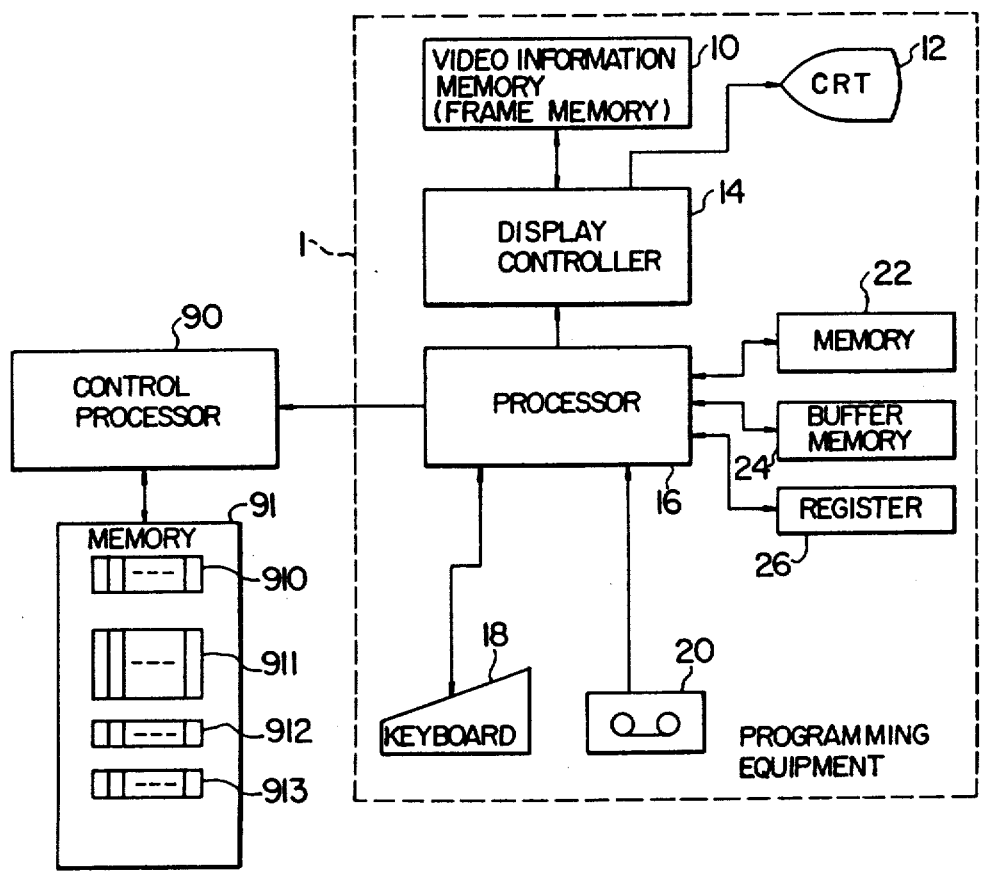
FIG. 1 shows a block diagram illustrating an overall configuration of an embodiment of the present invention.

Referring to FIG. 1, numeral 1 denotes programming equipment of the present invention which comprises a video information memory or frame memory 10 for storing a frame of video information, a CRT display unit 12 for displaying the video information stored in the video information memory 10, a display controller 14 for controlling the video information memory 14 and the display unit 12. The equipment 1 also includes processor 16 which may be a microcomputer, a keyboard 18, a cassette tape recorder (or a floppy disk) 20, a memory 22, a buffer memory 24 and a register 26. The program information constructed by the programming equipment 1 is stored in memory areas 910 and 911 of a memory 91 through a control processor 90 which controls an equipment (not shown) in accordance with the information stored in the memory areas 910 and 911. A memory area 912 of the memory 91 stores a table of subprograms and real addresses and a memory area 913 stores parameters which are used in a second embodiment to be described later.

Figure 2:
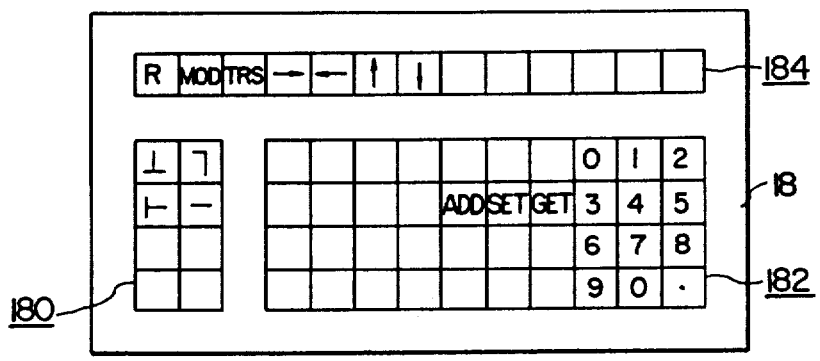
FIG. 2 shows an arrangement of a keyboard.

The keyboard 18 is arranged as shown in FIG. 2. It comprises a group of keys 182 for selecting one of a plurality of subprograms required to carry out desired operations (such as an ADD key for selecting an ADD subprogram for an add operation and a SET key for selecting a SET subprogram for setting a constant), a group of function keys 184 (such as keys "→", "←", "↑" and "↓" for controlling the positions of a cursor displayed on the CRT 12, a transfer key, a modification key and a reset (R) key) and a group of data flow specification keys 180 for inputting information of line components such as "⊥", "⊢", "⊣" and "—" for combining the data flows when the information flow among the subprograms displayed on the CRT 12 in the form of a block is to be represented as the data flow among the blocks.

Figures 3, 4:
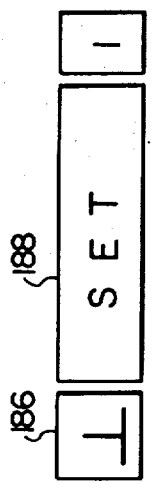
FIG. 3 shows an example of input data from the keyboard.
FIG. 4 shows a table of information stored in a table memory area of a memory 22.

Stored at the beginning of a cassette tape of the cassette tape recorder 20 is a table shown in FIG. 4 which has been previously prepared as required. The table includes information on subprogram names, leading addresses and subprogram memory capacities. It may also include information necessary to display the subprogram names on the CRT 12. The subprograms corresponding to the table are stored on the cassette tape at the addresses designated by the leading addresses in the table.

Figure 5A:
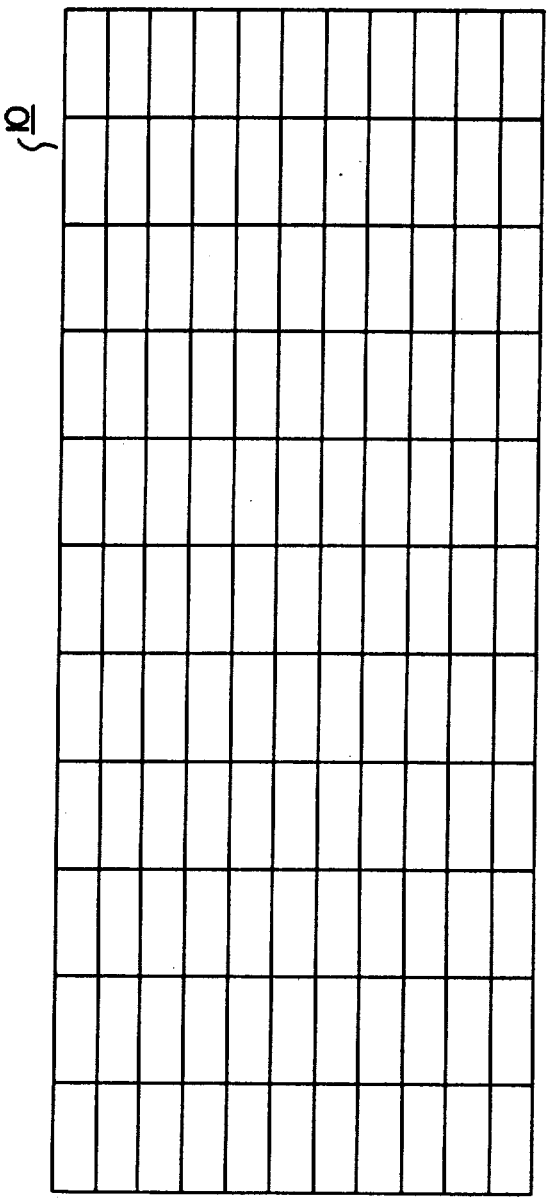
FIG. 5a shows an arrangement of a video information memory.
Figure 5C:
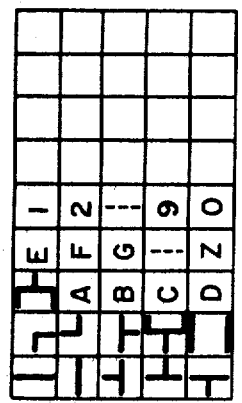
FIG. 5c illustrates types of picture cells.
Figure 5B:
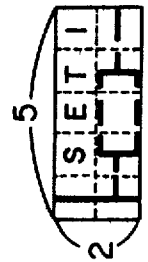
FIG. 5b shows an arrangement of picture cell areas of the video information memory.

The video information (frame) memory 10 is divided into 11×11 unit areas as shown in FIG. 5a and each unit area is subdivided into five rows by two columns of picture cell areas as shown in FIG. 5b. Types of picture cells are illustrated in FIG. 5c.

Figure 6A:
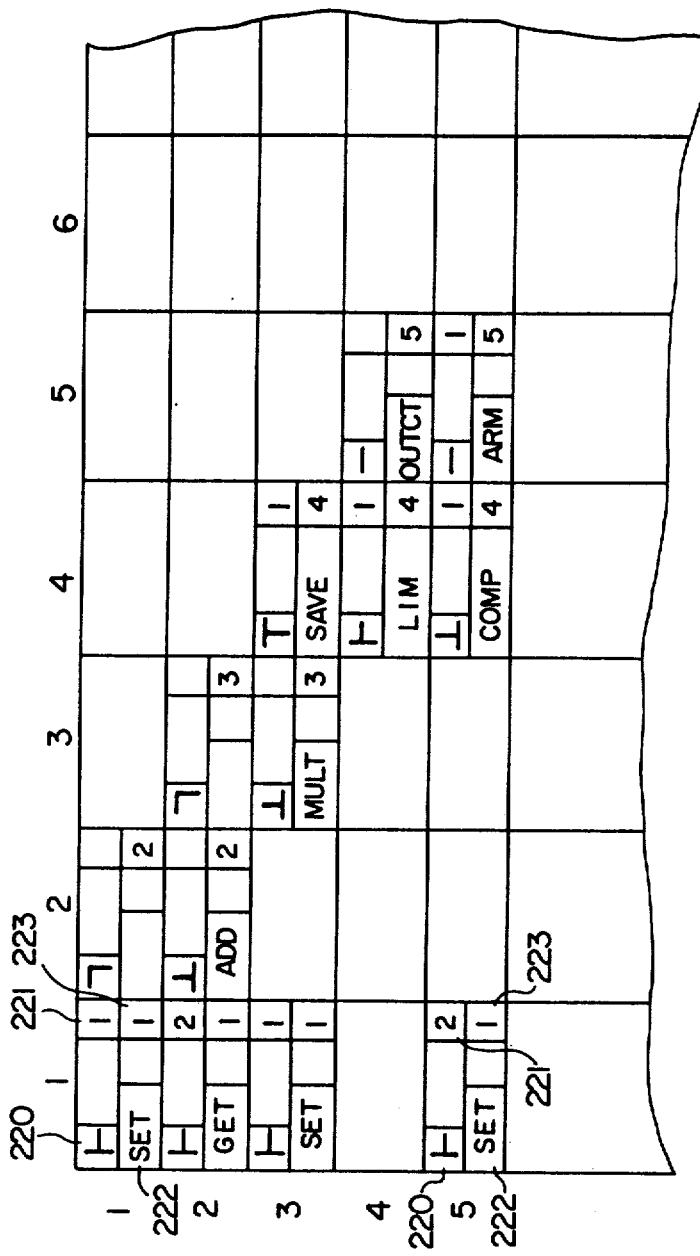
FIG. 6a shows an arrangement of a frame memory in the memory 22.
Figure 6B:
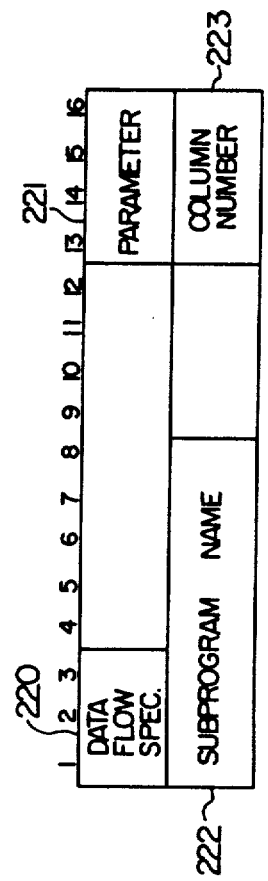
FIG. 6b shows an arrangement of a unit memory area of the frame memory.

The memory portion 22 has a frame memory comprising 11×11 unit memory areas as shown in FIG. 6a, corresponding to the 11×11 unit memory areas shown in FIG. 5a. As shown in FIG. 6b, each unit memory area comprises a data flow specification memory area 220, a parameter memory area 221, a subprogram name memory area 222 and a column number memory area 223. The memory 22 also has an area which stores picture cell information and a selective output program for selectively outputting picture cells shown in FIG. 5c in accordance with the data flow specifications, the parameters, the subprogram names and the column numbers. It also has a table memory area, an address memory areas for specifying an address of the memory 91, a temporary memory area for the input key information and an error indication flag memory area. In the second embodiment, the memory 22 further includes an instruction construction memory area, a temporary memory area for picture cells and a parameter memory area.

The buffer memory 24 is provided to transfer the program constructed by combining the subprograms to the external memory 91.

Figure 7:
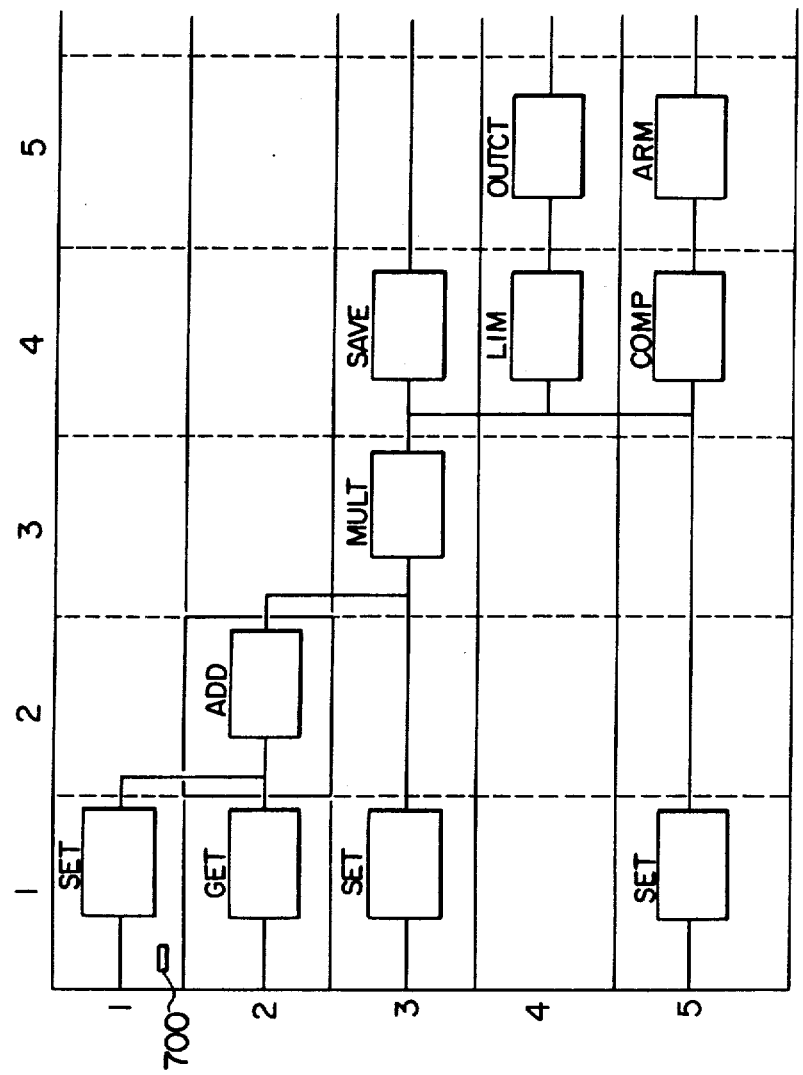
FIG. 7 shows a display chart of a cathode ray tube (CRT) 12.

The register 26 stores the column numbers and the row numbers of the 11×11 unit memory areas. FIG. 7 shows an image displayed on the CRT 12 in which numeral 700 denotes a cursor.

Referring to flow charts of FIGS. 8 to 13, the operation of the first embodiment of the present invention is explained.

Figure 8:
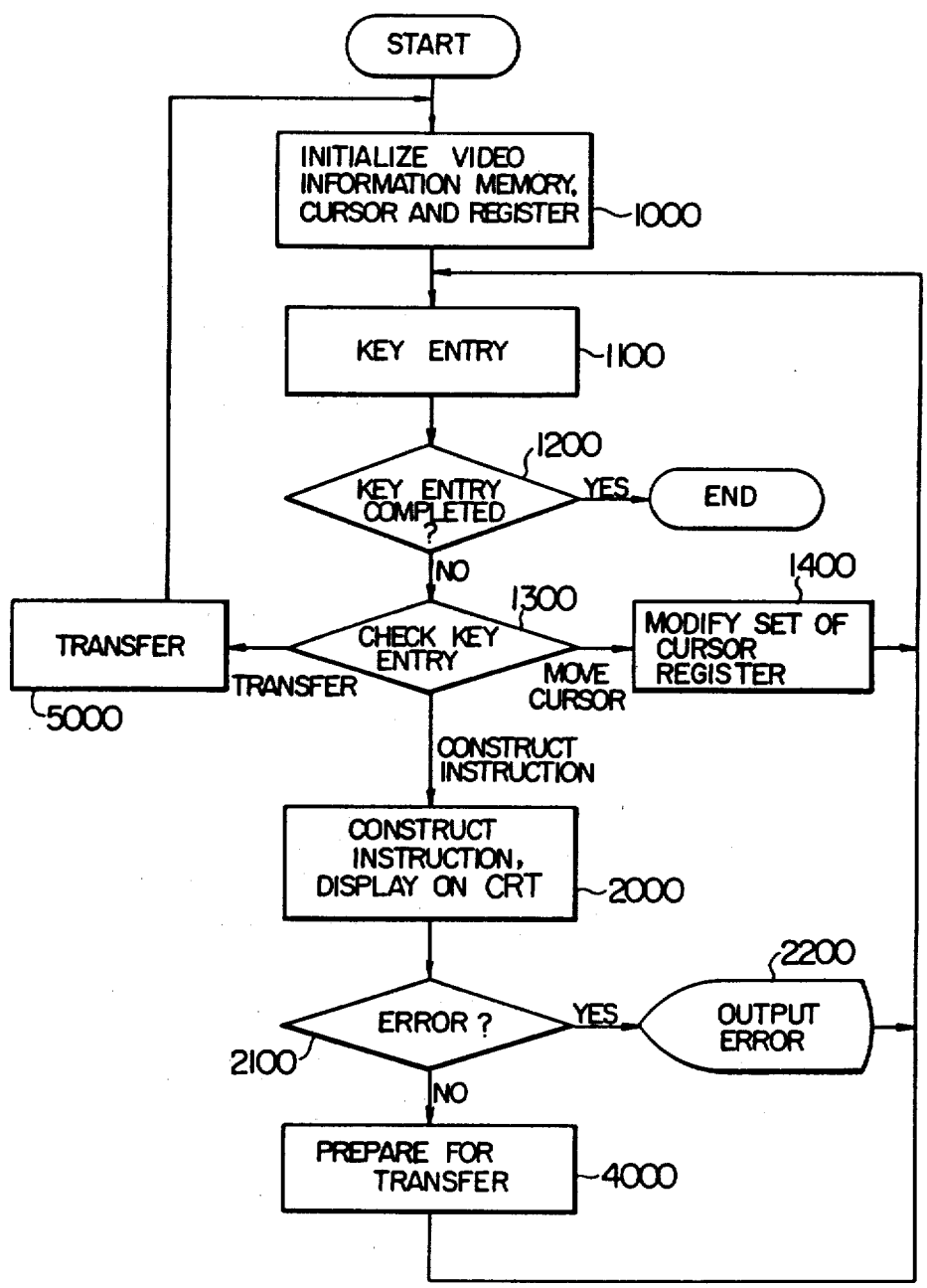
Figure 9:
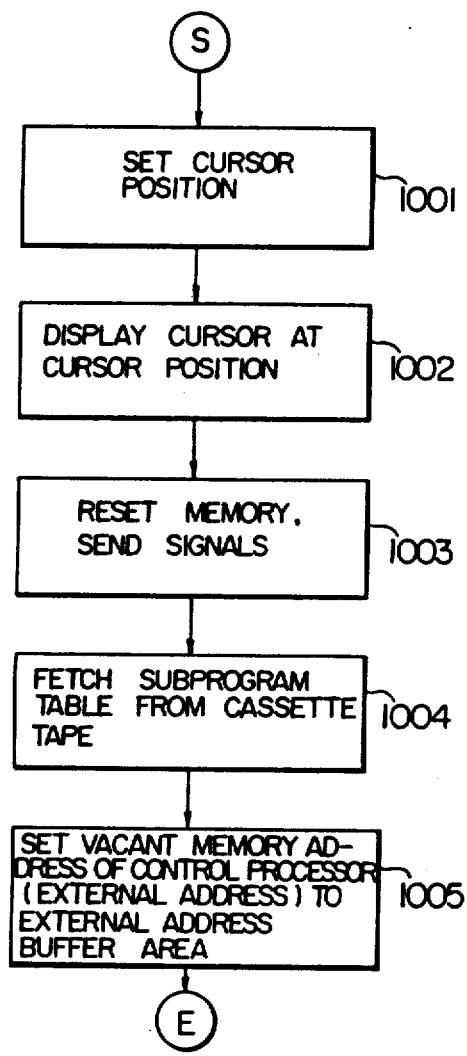

An initialization step 1000 of FIG. 8 is first executed. The details thereof are shown in FIG. 9. The processor 16 sets "1" and "1" into the column number memory area and row number memory area, respectively, of the register 26 to locate the cursor of the CRT 12 at a home position (step 1001). The processor 16 reads out the content (1, 1) of the register 26 and provides it to the display controller 14, which causes the CRT 12 to display the cursor at the unit area of row No. 1 and column No. 1 of the 11×11 unit areas (step 1002). The processor 16 also sends out signals to reset the video information (frame) memory 10, the memory 22 and the buffer memory 24 (step 1003).

The processor 16 then reads out a table as shown in FIG. 4, which is stored at the beginning of the cassette tape, from the cassette tape recorder 20 and stores it into a table memory area of the memory 22 (step 1004). A step 1005 will be described later.

In order to construct a desired program by combining subprograms for executing various processes which are previously stored in the cassette tape, an operator inputs information by way of the keyboard 18 while monitoring the screen of the CRT 12. The operator watches a cursor displayed at the unit area of the column No. 1 and the row No. 1 of the CRT 12 to input the information to that unit area. The information to be inputted to that unit area, for example, a data flow specification "⊢", a subprogram "SET" and a parameter "1" is entered by sequentially depressing a key "⊢" of the group of data flow specification keys 180 of the keyboard 18, a key "SET" and a key "1" of the group of keys 182. In addition to the instruction information described above, information such as end of program input, an instruction to move the cursor and an instruction to transfer the program may be entered by way of the keyboard 18. Those inputs may be entered by depressing corresponding ones of the group of function keys 184 on the keyboard 18. In the key entry step 1100, the processor 16 loads predetermined codes corresponding to the depressed keys into temporary memory areas of memory 22 for the keyed information. The processor 16 then determines if the code in the temporary memory area is the code representing the end of program input (step 1200) and if it is the processor 16 terminates the process. If it is not, the processor 16 determines the type of keyed input (step 1300). If it is the transfer instruction, the transfer process is carried out (step 5000), and if it is the move cursor instruction, the cursor register is modified (step 1400). Those steps 1400 and 5000 will be described later.

In the cases other than the above, a step 2000 is carried out. (Detail of the step 2000 is shown in FIG. 10). The processor 16 detects the keyed input "⊢" and stores the information "├" into the memory 22, more specifically into the data flow specification memory area 220 in the unit memory area at the column No. 1 and the row No. 1 of the frame memory, as shown in FIG. 6a. It also stores "1" which has been stored in the column information memory area of the register 26 into the column number memory area 223. The processor 16 also selectively reads out picture cells corresponding to the keyed input "├" from the picture cell information area and the selective output program, which are stored in the memory 22, and loads "1" into the column No. 1 and row No. 1 picture cell memory area of the memory area at the column No. 1 and the row No. 1 of the video information memory 10 and loads "├" into the row No. 2 and column No. 1 picture cell memory area, as shown in FIG. 5b (step 2003). The processor 16 then detects the keyed input "SET" and checks if "SET" has been registered in the table memory area in the memory 22 (step 2004). In the present embodiment, since it is registered, the next step (2005) is carried out. The processor 16 stores "SET" in the subprogram name memory area 222 in the unit memory area at the column No. 1 and the row No. 1 of the frame memory shown in FIG. 6a (step 2005). The processor 16 reads out the picture cells corresponding to the keyed input "SET" in the same manner as described above and loads "S" in the row No. 1 and column No. 2 memory area at the column No. 1 and the row No. 1 of the video information memory 10, "E" to the row No. 1 and column No. 3 memory area, "T" at the row No. 1 and column No. 4 memory area and block information, that is, "-[" to the row No. 2 and column No. 2 memory area, "=" to the row No. 2 and column No. 3 memory area, "}" to the row No. 2 and column No. 4 memory area "−" to the row No. 2 and column No. 5 memory area, as shown in FIG. 5b (step 2006). If it is determined that "SET" is not registered in the registration check step 2004, the steps 2005 et seq are not carried out but an error flag in the memory 22 is set and an error is determined in a decision step 2100 shown in FIG. 8 and the processor 16 sends an error signal to the CRT 12 through the display controller 14 so that error is displayed on the CRT 12 (step 2200).

When the keyed input "1" is detected, the processor 16 loads "1" into the parameter memory area 221 at the column No. 1 and the row No. 1 of the frame memory shown in FIG. 6 and "1" into the row No. 1 and column No. 5 memory area at the column No. 1 and row No. 1 of the video information memory 10.

In this manner, the information shown in FIG. 6a is stored in the frame memory in the memory 22. The information shown in FIG. 5b is stored in the corresponding memory areas of the video information memory 10. The display controller 14 reads out the display information from the video information memory 10 and displays the blocks, the data flow and the subprogram names on the CRT 12 as shown in FIG. 7 (step 2008). Subsequently, the processor 16 shifts the cursor position rightward one position at a time (shifts the column position) (step 2009). More specifically, the column number of the register 26 is incremented by one to change the content of the register to (2.1). The content (2.1) of the register 26 is read by the processor 16 and the cursor is displayed at the row No. 1 and column No. 2 unit area by the display controcontroller 14.

When one of the move cursor keys "→", "←", "↑" and "↓" on the keyboard is depressed, the column number or the row number in the register 26 is incremented or decremented by one depending on the direction of the arrow on the corresponding key so that the display of the cursor 700 on the screen of the CRT 12 shown in FIG. 7 is moved by one unit memory area in the direction of the arrow on the key (step 1400).

As a convention, the direction of data flow specified by the data flow specification is left-to-right and top-to-bottom. The data flow among the blocks in the direction of right-to-left or bottom-to-top is not permitted. The operator, therefore, must comply with this control condition when he or she keys in the information.

Following the above steps, an information transfer preparation step is carried out. In the initialization step 1000, the leading address 500 of the subprogram memory area 911 of the memory 91, is loaded into an area in the memory 22 which stores address specification information of the memory area 911 (hereinafter called an external address buffer area) (step 1005).

Figure 11:
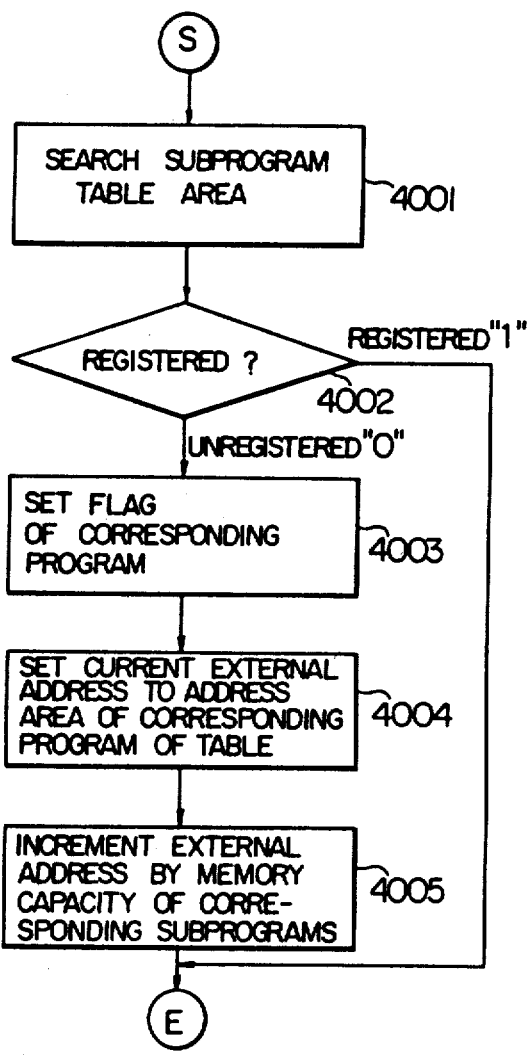

Immediately after the initialization, when the operator keys in "SET" to move to the transfer preparation step 4000 (the details of which is shown in FIG. 11), the processor 16 checks if "SET" is registered in the table memory area in the memory 22 (step 4001) to confirm the registration (step 4002). As shown in FIG. 4, the processor 16 searches the information in the flag information memory area corresponding to "SET" (step 4001) to check if the flag information is "1" (registered) or "0" (unregistered) (step 4002). In the present embodiment, since the flag information is "0", "1" is set into the flag information memory area (step 4003) and the initial address 500 stored in the external address buffer area in the memory 22 is written into the external address memory area of the table corresponding to "SET" (step 4004). A content 50 of the subprogram memory capacity memory area is added to the content 500 of the external address buffer area and the resulting sum 550 is written into the external address buffer area to prepare for the next write operation to the external address memory area of the table (step 4005). If it is determined that the information of the flag information memory area corresponding to "SET" is "1" by the decision step 4002, neither the updating of the content of the external address buffer area nor the writing to the external address memory area of the table is carried out.

The information of the table corresponding to the subprogram name which has not been entered by the keyboard 18 in the transfer preparation step 4000 is "0" and the external address of the table corresponding thereto is also "0". The flag information of the table corresponding to the subprogram which has once entered is "1" and the external address of the table corresponding thereto is equal to the content of the external address buffer area at the time when the subprogram was entered. The flag information of the table for the subprogram name which has been entered twice or more is "1" and the external address of the table corresponding thereto is equal to the content of the external address buffer area at the time when the subprogram was first entered.

In this manner, the subprogram names which are minimum requirements for the program to be constructed by the operator entry and the leading addresses for storing those subprograms in the external memory 91 can be produced. Since the external addresses are updated in accordance with the subprogram capacity, the external addresses (the addresses of the memory 91) of the subprograms are determined such that no vacant area is produced between the subprograms when the subprograms are stored in the memory 91.

Figure 12:
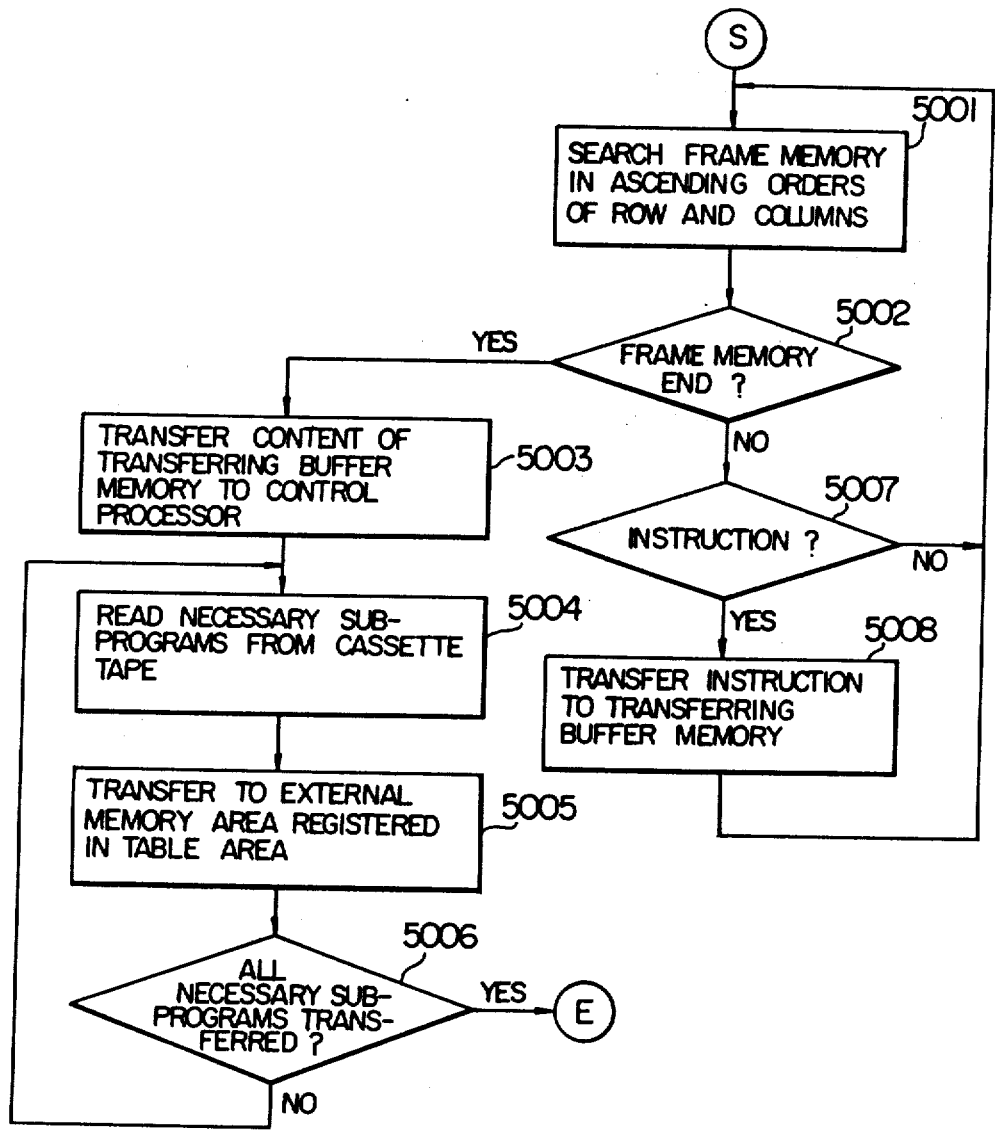

When a frame of information has been entered in this manner, the operator depresses the transfer key in the group of function keys 184. After the execution of the key entry step 1100 and the decision steps 1200 and 1300, the processor 16 executes the step 5000 (detail of which is shown in FIG. 12). More particularly, the processor 16 searches the frame memory portion of the memory 22 one unit memory area at a time in an ascending order of the rows and in an ascending order of columns.

More specifically (1) the processor 16 searches the unit memory areas in FIG. 6a in the order of (1.1), (1.2), (1.3), ... (1.11), (2.1), (2.2), ... (2.11), (3.1), (3.2), ... (11,1), ... (11.11) (step 5001).

(2) The processor 16 determines if an instruction is present in a search position (step 5007), and if it is present, the processor 16 transfers the subsequent unit information (i, j) to the transferring buffer memory 24 (step 5008), and if the instruction is not present the processor 16 searches the next unit memory area. In the case of the frame memory shown in FIG. 6a, the information at the unit memory areas (1.1), (1.2), (2.1), (2.2), (2.3), (3.1), (3.3), (3.4), (4.4), ... only is stored in the buffer memory 24 in this order.

(3) If the end of frame memory is detected in the decision step 5002, the processor 16 sequentially reads out the information from the buffer memory 24 in the above order and stores it in the memory area 910 of the memory 91 through the control processor 90.

(4) After the information has been stored in the memory area 910, the processor 16 reads out the subprograms having the "1" flag information of the table of the memory 22 (see FIG. 4) and the corresponding external addresses and stores them in the memory area 912 of the memory 91.

(5) Thereafter, the processor 16 reads out the subprograms having the "1" flag information of the table of the memory 22 and the corresponding leading addresses, the subprogram memory capacities and the external addresses from the memory 22 in order to store them in the memory area 911. The processor 16 then reads out the subprogram comprising the instructions which are stored in the positions starting from the read-out leading address and extending by the length indicated by the subprogram memory capacity, from the cassette tape of the cassette tape recorder 20 (step 5004), and stores the subprogram in the memory area 911 with the address of the memory area 911 of the memory 91 indicated by the read-out external address being a leading address (step 5005). This step is repeated until all of the subprograms having the "1" flag information of the table of the memory 22 have been stored in the memory area (step 5006).

Through those steps, a frame of programs are stored in the memory 91.

Figure 13:
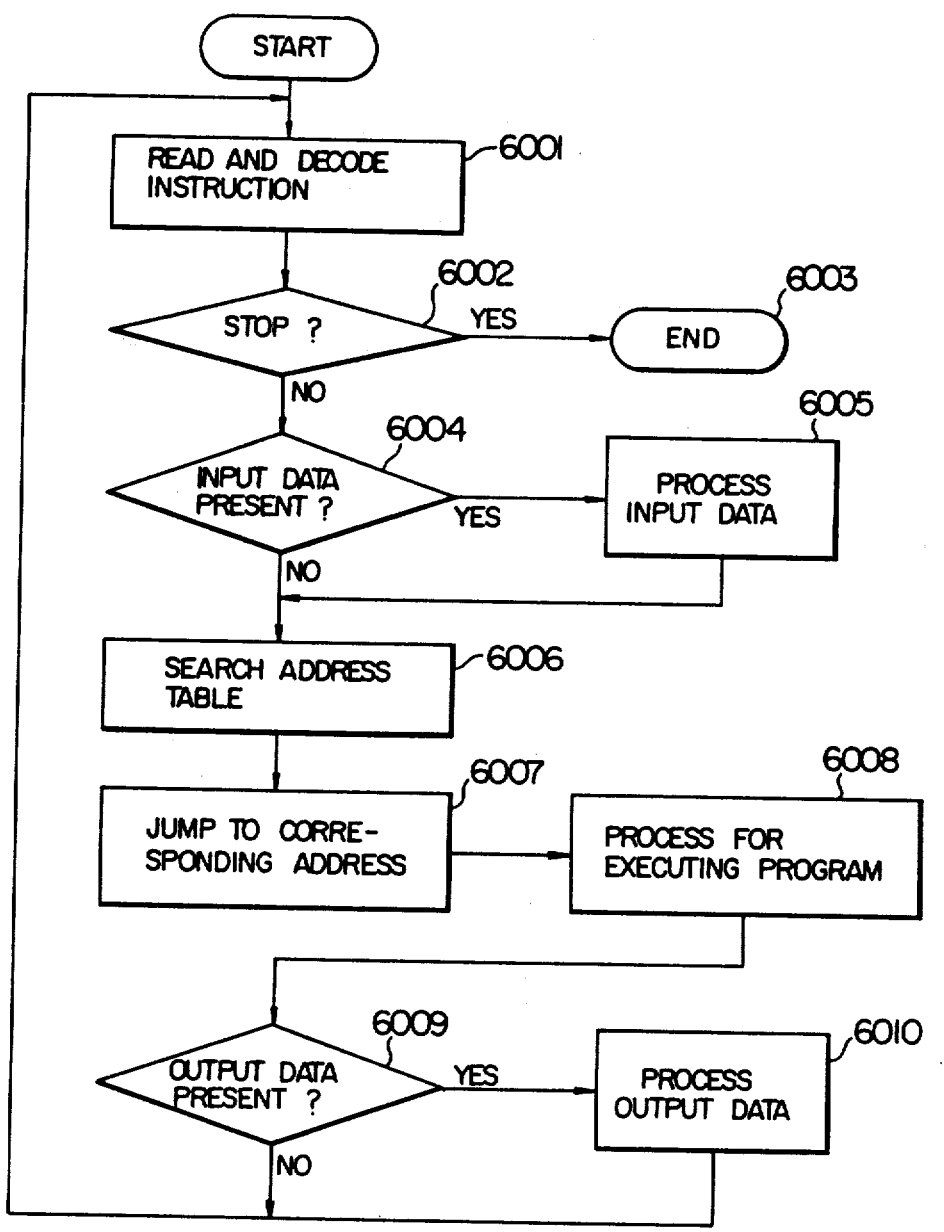

The control processor 90 executes those programs in a manner shown in FIG. 13. It will be explained below in connection with FIG. 6a.

The control processor 90 sequentially reads out the instructions from the memory area 910 (step 6001). It determines if the instruction indicates the stop (step 6002) and if it does the control processor 90 stops the execution (step 6003). The control processor 90 first reads out the unit information (1.1) stored in the first area in the memory area 910. Before it executes the subprogram "SET" based on the read-out column No. 1 and "⊢", it checks if an input data is not present (step 6004). In order to translate the read-out "SET" to the subprogram designated by "SET", the control processor 90 searches the table of subprogram name to address in the memory area 912 (step 6006), reads out the address corresponding to the subprogram name "SET" and executes the subprogram stored at the corresponding address (step 6007). In the present example, since the program "SET" is to present the parameter as the output data (step 6008), the control processor 90 sets the parameter "1" stored in the unit information (1.1) as the input information to the unit information (1.2) (steps 6009 and 6010).

The control processor 90 then reads out the unit information (1.2) stored in the second area in the memory area 910. The information read out includes "⏋" and the column No. "2" and no information on the subprogram name and the parameter. Accordingly, the unit information (1.2) is detected as the transfer information and the control processor 90 sets "1" which was previously set in the process for the unit information (1.1) as the input information to the unit information (2.2) in the next sequential row in the column No. 2 based on the information "⏋" (steps 6009 and 6010).

Then the control processor 90 reads out the unit information (2.1) stored in the third area in the memory area 910. Before executing the subprogram "GET" based on "⊢" and the column No. "1", the control processor 90 checks to see if an input data is not present. Like in the previous step, the control processor 90 reads out the subprogram corresponding to "GET", reads out information X from the register specified by the parameter "2" (step 6008) and sets it as the input data to the unit information in the next sequential column in the same row, that is, the unit information (2.2).

The control processor 90 then reads out the unit information (2.2) stored in the fourth area in the memory area 910 (step 6001). It detects based on "⊥" that two input informations "1" and "X" have been set in the previous steps by the unit informations (1.2) and (2.1) (step 6004), processes those input data (step 6005), adds those two input data based on the subprogram corresponding to the read-out "ADD" (step 6007), that is, calculates 1+X (step 6008), and sets the resulting sum data as the input information to the unit information (2.3) in the next sequential column in the same row (step 6010).

In this manner the control processor 90 carries out the operations to control the equipments based on the operation results.

Figure 14:
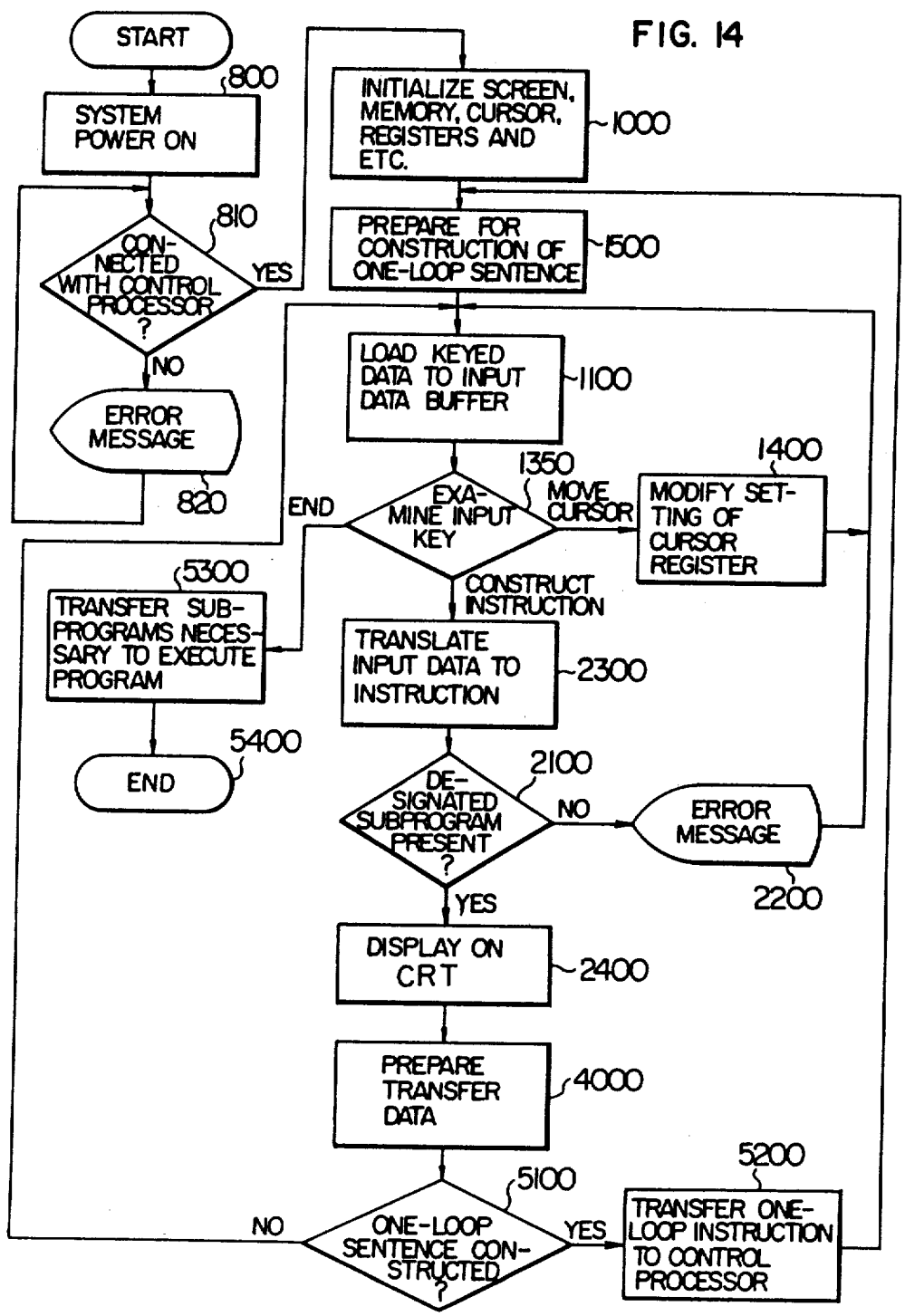
Figure 15:
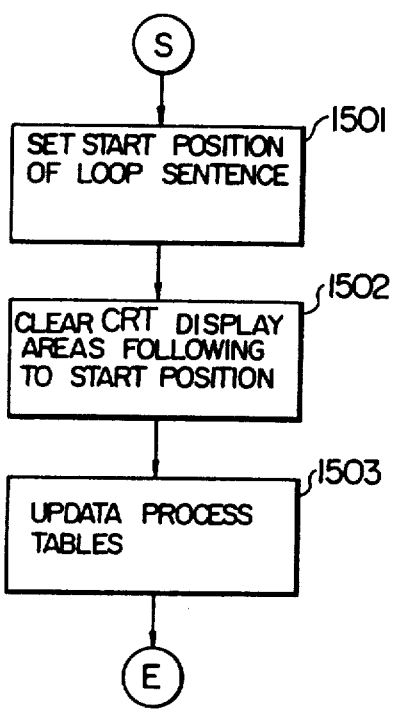

The operation of a second embodiment which is a partial modification of the operation of the first embodiment explained in FIGS. 8 to 12 is now explained with reference to flow charts of FIGS. 14 to 19. Referring to FIG. 14, when the present system is powered on (step 800), the processor 16 determines if the system 1 is connected with the control processor 90 (step 810), and if it is not connected an error message is displayed on the CRT 12 (step 820). This operation is also necessary in the first embodiment shown in FIG. 8 and it is actually incorporated at any time after the transfer key is depressed and before the transfer step 5000 is carried out, although it is not explained here for the purpose of simplicity. In the second embodiment, the operation is modified such that the instruction transfer step 5200 to the control processor 90 is executed automatically. Accordingly, the connection checking step 810 is necessary to assure smooth operation of the processor 16. After the processor 16 has confirmed the connection, the initialization step 1000 of FIG. 14 is executed. This step is exactly the same as that in the first embodiment and the detail thereof is shown in FIG. 9. Therefore, the explanation thereof is omitted. The processor 16 then carries out the one-loop sentence construction preparation step 1500. The one-loop sentence means a series of instructions closed by themselves. That is, it means a group of instructions interconnected by the data flow specifications. In the second embodiment, upon the completion of the construction of the one-loop sentence, the group of instructions are automatically transferred to the control processor 90. They are prepared in the one-loop sentence construction preparation step 1500 shown in detail in FIG. 15. After the completion of the one-loop sentence transfer step 5200, the processor 16 updates the register 26 to set "1" into the column number position and the current row number plus one into the row number position in order to display a cursor on the CRT 12 at the start position of the loop sentence construction (step 1501). When the initialization step 1000 is carried out, the step 1501 is omitted. The processor 16 then clears the image display area following the start position on the CRT 12 (step 1502). Particularly, the content of the video information memory following the start position is erased. The processor 16 also erases the content of the frame memory following the start position, resets the buffer memory and updates the tables necessary to the subsequent steps (step 1503).

Figure 16:
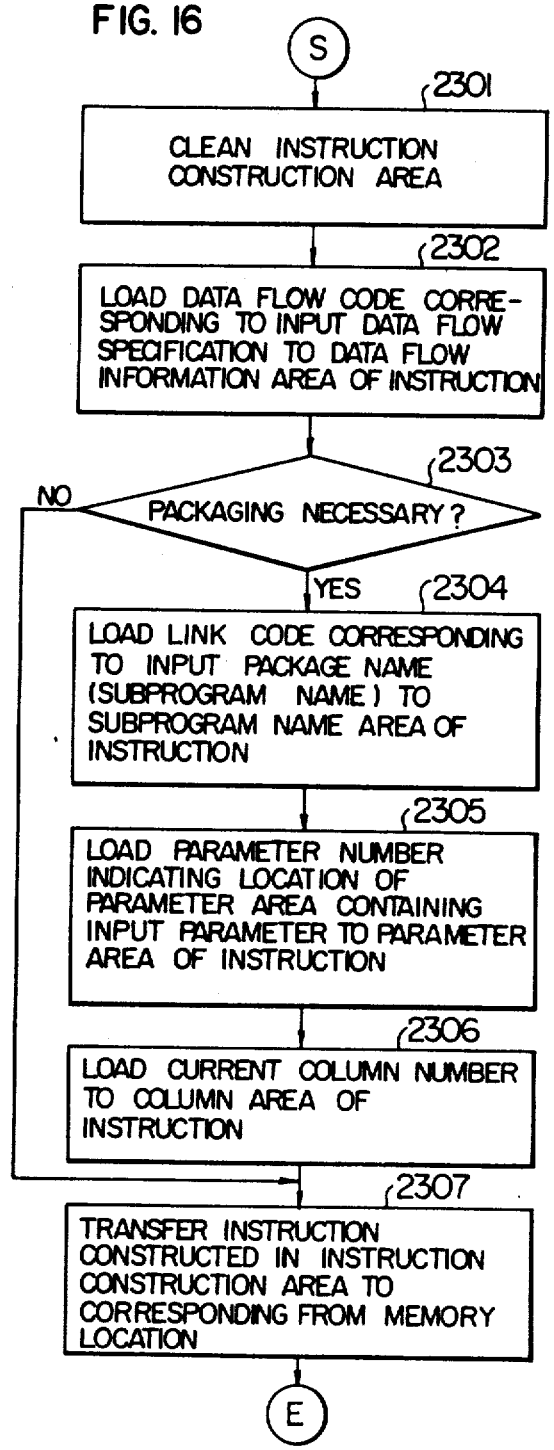

The key entry step 1100 to enter input data from the operator keys into the temporary keyed information memory area in the coded form is exactly same as that of the first embodiment shown in FIG. 8. In the input key determination step 1350 in which the established code is determined, the cursor movement step is the same as the step 1400 in the first embodiment and hence it is not explained here. In the determination step 1350, if the entry of the end of program key is detected, the processor 16 stops operation after it has executed the package transfer step 5300 of the subprograms (step 5400). The step 5300 will be described hereinafter. If the processor 16 detects the instruction construction in the input key determination step 1350, it executes the instruction translation step 2300, the detail of which is shown in FIG. 16. More specifically, the processor 16 erases the content of the instruction construction area separately arranged in the memory 22 (step 2301) and loads the predetermined data flow code corresponding to the keyed data flow specification into the data flow specification area (corresponding to 220 in FIG. 6) of the instruction construction area (step 2302). Then, the processor 16 determines the necessity of the execution of the subsequent steps 2304 to 2306 depending on the type of the data flow specification (step 2303). For example, if the data flow specification is " ⏋ " or "1", the execution (step 2304 to 2306) of the subprograms is not necessary and they are skipped. For the other data flow specifications, the processor 16 loads a link code corresponding to the input subprograms (that is, a code indicating the location of the corresponding subprogram information in the subprogram table area) into the subprogram name area (corresponding to 222 in FIG. 6) of the instruction construction area (step 2304). The input parameter is temporarily stored in the parameter memory area in the memory 22 and it is transferred in the one-loop instruction transfer step 5200 to the parameter area 913 in the memory 91 of the control processor 90. (This process is to permit the presence of a plurality of parameters. In the first embodiment the designation of only one parameter is allowed but in the present embodiment the designation of a plurality of parameters is allowed.) To this end, the parameter number which indicates the memory location of the parameter in the parameter area 913 is loaded into the parameter area (corresponding to 221 in FIG. 6) of the instruction construction area (step 2305). Then, the processor 16 loads the current column number stored in the register 26 into the column number area (corresponding to 223 in FIG. 6) of the instruction generation area (step 2306). The processor 16 then transfers the content of the instruction construction area to the corresponding frame memory (step 2307).

Then, the processor 16 checks for the presence of the designated subprogram as shown in FIG. 14 (step 2100), and if the corresponding subprogram is absent, the processor 16 produces an error message (step 2200) as in the case of the first embodiment and returns to the key entry step 1100. When the presence of the subprogram is detected, the processor 16 carries out the image display step 2400, the detail of which is shown in FIG. 17. More specifically, the processor 16 clears the temporary picture cell memory area in the memory 22 (step 2401), selectively reads out the data flow picture cells corresponding to the data flow code in the data flow specification area in the instruction (step 2402) and the name picture cells (step 2403) and the box picture cells (step 2404) converted to the image display codes from the program name information in the subprogram table area corresponding to the link code of the instruction, from the picture cell information in the memory 22 and loads them into the temporary picture cell memory area. More particularly, the operation is the same as that performed for the "SET" input in the first embodiment shown in FIG. 8. The processor 16 then transfers the content of the temporary picture cell memory area to the corresponding positions in the video information memory (step 2405). The CRT display step 2406 by the display controller 14 and the cursor movement display step 2407 are the same as the steps 2008 and 2009 shown in FIG. 10 for the first embodiment. The image display step 2400 differs from the step in the first embodiment in that in the first embodiment the video information is directly written into the video information memory simultaneously with the construction of the instruction while in the second embodiment the image information constructed through the buffer or the temporary picture cell memory area is transferred to the video information memory in union separately from the translation of the instruction. In the second embodiment, it is easy to read out the instruction previously constructed.

Figure 19:
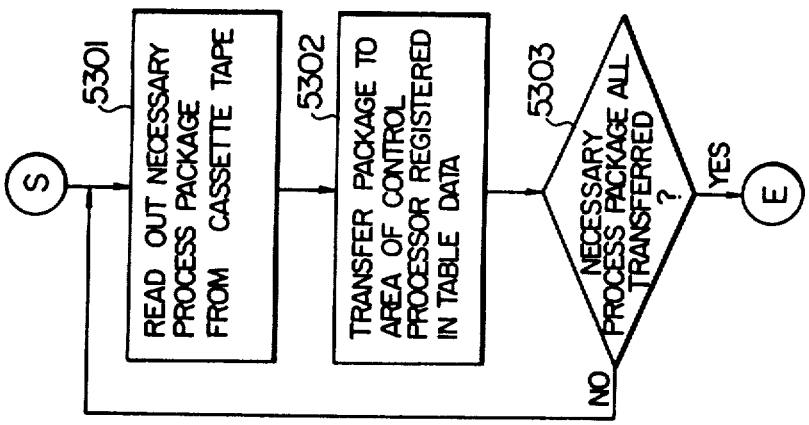
Figure 18:
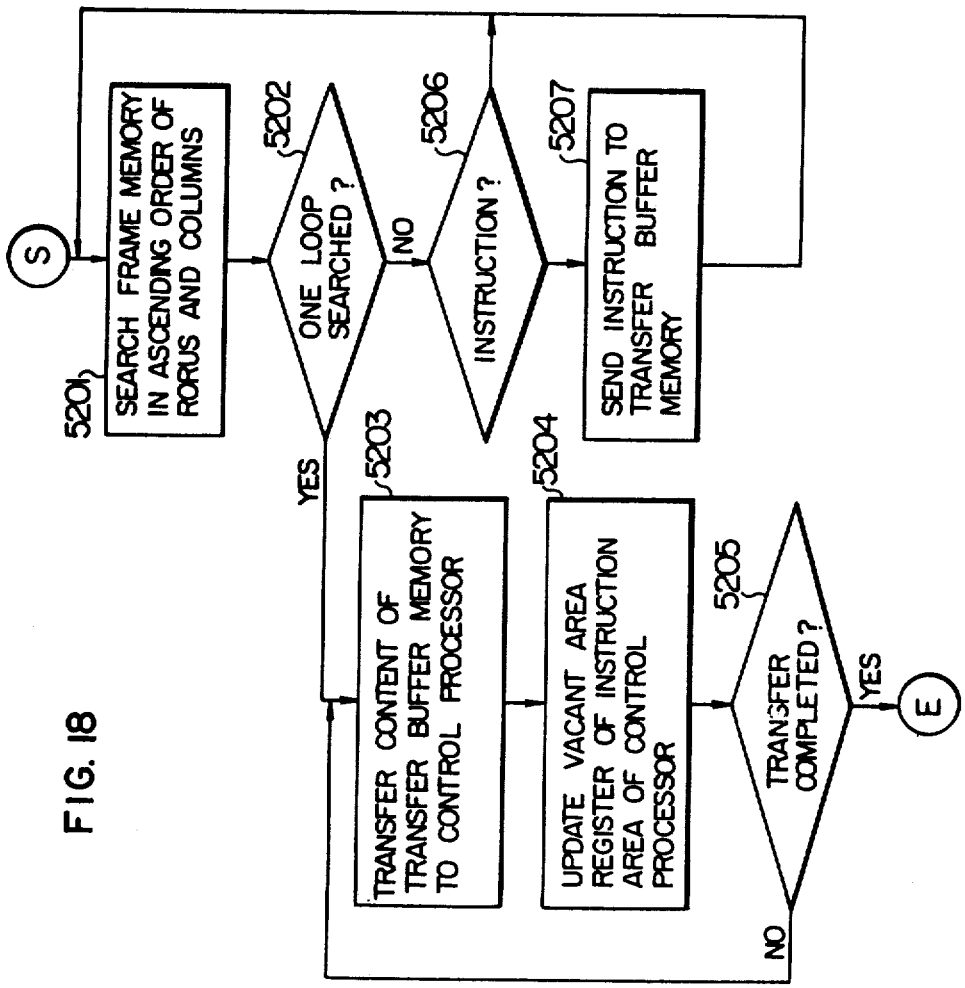

The transfer preparation step (4000) following the image display step (2400), is the same as that in the first embodiment and hence it is not explained here. As the instructions are sequentially constructed as described above and the one-loop sentence is constructed (step 5100), the processor 16 transfers the one-loop instructions to the control processor 90 (step 5200). Detail of the step is shown in FIG. 18. The processor 16 searches the frame memory in the ascending order of the rows starting from the start position of the loop sentence (step 5201) and sequentially loads the instructions in the memory frame (step 5206) to the transfer buffer memory 24 (step 5207) until the one-loop instructions have been searched (step 5202). The load step is the same as that in the first embodiment. As the one-loop instructions have been loaded (step 5202), the contents of the transfer buffer memory are sequentially transferred to the area 910 in the memory 91 of the control processor 90. Necessary parameters are simultaneously transferred to the parameter area 913 in the memory 91 of the control processor 90 (step 5203). This transfer step continues until all of the instructions have been transferred (step 5205) while updating the counter in the memory 22 which indicates vacant areas of the instruction storage area 910 and the parameter area 913 in the control processor (step 5204). When all of the instructions have been transferred (step 5205), the preparation step 1500 for the construction of the next loop sentence is initiated. The above steps are repeated until all of the programs have been constructed, when the end of program entry key is depressed and the end is detected by the input key determination step 1350. Then the subprograms designated by the above programs are read out of the cassette tape 20 and the transfer step 5300 to the area 911 in the control processor 90 is executed. The details thereof are shown in FIG. 19 in which the steps 5301 to 5303 are exactly same as the steps 5004 to 5006 shown in FIG. 12 for the first embodiment and hence they are not explained here.

The second embodiment has thus been described. As described above, the second embodiment differs from the first embodiment in that the connection confirmation step 801 is included, the automatic transfer step 5200 is included and the instruction construction step 2000 is divided into the instruction translation step 2300 and the image display step 2400. The instructions constructed in the second embodiment are executed by the control processor 90 in accordance with the procedures shown in FIG. 13. Since the parameters are indirectly designated, fetching of real parameters from the parameter area 913 in the program execution step 6008 is not necessary unlike the first embodiment.

As described hereinabove, according to the present invention, the programs can be constructed by the block diagram image so that users having little or no knowledge about the electronic computer can readily construct the programs. The modification and addition of the programs can be readily accomplished by the modifications and additions of the subprogram names and the data flow specifications. Furthermore, since the programs are constructed in the unit of a subprogram, the possibility of misconstruction of the programs is reduced.

What is claimed is:

1. A programming equipment comprising:
a display unit including means for displaying in each of a plurality of partial display areas on a display screen the symbol of a subprogram comprising a block diagram image and the name of a subprogram predetermined for each of a plurality of arithmetic and logical operations with a data flow indicating symbol between block diagram symbols to indicate the path of data flow between subprograms;
memory means having a plurality of unit memory areas, one for each of said plurality of partial display areas of said display unit, for storing data relating to selected subprograms and having an address memory area for storing address information to designate one of said plurality of unit memory areas;
an input including means for inputting names of subprograms, data flow specifications for specifying symbols indicating the data flows between said subprograms, instructions for modifying said address information stored in the address memory area of said memory means and instructions for reading out data from said plurality of unit memory areas of said memory means to an external program utilization unit; and
processor means connected to said display unit, said input device and said memory means for storing the names of subprograms and said data flow specifications received from said input device into the unit memory areas of said memory means designated by said address information stored in said address memory area of said memory means and for controlling said display unit to display the symbols and names of said subprograms and the data flows specified by said data flow specifications as stored in said memory means in the partial display areas on the screen of said display unit designated by said address information, including means for reading out the names of said subprograms and said data flow specifications from said plurality of unit memory areas in a predetermined sequence to said external program utilization unit.

2. A programming equipment according to claim 1 wherein said memory means includes a subprogram memory area having a plurality of subprograms stored therein and flag information areas, one for each of said plurality of subprograms, and said processor means includes means for setting the flag information area corresponding to the name of a subprogram received from said input device and for reading out from the subprogram memory area the subprogram corresponding to the flag information area set by said processor in response to the read-out instructions from said input device.

3. A programming equipment according to claim 2 wherein said display unit includes frame memory means for storing a frame of video information to be displayed on said display screen and display controller means connected to said processor means for storing in said frame memory means video information corresponding to the symbols and names of the subprograms and the data flows specified by said data flow specifications as stored in said memory means.

4. A programming equipment according to claim 3, further including a control processor connected to said processor means for controlling said external program utilization unit and including external memory means for storing a series of subprograms in successive storage locations to form a program for control of said external program utilization unit by said control processor.

5. A programming equipment according to claim 4 wherein said memory means includes a buffer memory area for storing an address of said external memory means representing a beginning address for storing a subprogram therein, and wherein said processor means includes means for transferring subprograms from said subprogram memory area of said memory means to said external memory means for storage beginning at the address stored in said buffer memory area in response to said read-out instruction from said input device and in accordance with the names of the subprograms stored in the unit memory areas of said memory means.

6. A programming equipment according to claim 5 wherein said memory means includes a subprogram memory capacity area for storing the memory capacity required for each subprogram in said subprogram memory area, and wherein said processor means includes means for increasing the value of the address stored in said buffer memory area by the amount of the memory capacity of a subprogram transferred to said external memory means in accordance with the information stored in said subprogram memory capacity area for that subprogram at each time of transfer of a subprogram to said external memory means so that each subprogram is stored in said external memory means immediately adjacent to the previous subprogram transferred thereto.

* * * * *